(12) United States Patent
Kaynak et al.

(10) Patent No.: US 7,561,640 B2
(45) Date of Patent: Jul. 14, 2009

(54) METHOD AND APPARATUS FOR INTERATIVE NOISE WHITENING WITH CAUSAL AND ANTI-CAUSAL PREDICTION FILTERS

(75) Inventors: Mustafa Nazmi Kaynak, Tempe, AZ (US); Erozan Mehmet Kurtas, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 662 days.

(21) Appl. No.: 11/102,622

(22) Filed: Apr. 8, 2005

(65) Prior Publication Data

US 2006/0227902 A1 Oct. 12, 2006

(51) Int. Cl.
*H04L 27/06* (2006.01)
(52) U.S. Cl. .................. 375/340; 375/316; 375/229; 375/341
(58) Field of Classification Search ............ None
See application file for complete search history.

(56) References Cited

U.S. PATENT DOCUMENTS

| | | | |
|---|---|---|---|
| 5,784,415 A * | 7/1998 | Chevillat et al. ............ 375/341 |
| 6,201,839 B1 * | 3/2001 | Kavcic et al. ............... 375/341 |
| 6,434,233 B1 * | 8/2002 | Bjarnason et al. ....... 379/406.01 |
| 6,625,235 B1 * | 9/2003 | Coker et al. ................ 375/341 |
| 6,691,263 B2 * | 2/2004 | Vasic et al. ................. 714/709 |
| 6,757,122 B1 | 6/2004 | Kutznetsov et al. .......... 360/53 |
| 2002/0154712 A1 * | 10/2002 | Cideciyan et al. .......... 375/341 |
| 2003/0043487 A1 | 3/2003 | Morita et al. ................ 360/25 |
| 2003/0066020 A1 | 4/2003 | Morita et al. ............... 714/794 |
| 2005/0062623 A1 * | 3/2005 | Lee et al. .................... 341/107 |

OTHER PUBLICATIONS

Hau, H.Y. & Kashyap, R.L.; "Belief Combination and Propagation in a Lattice-Structured Inference Network," *IEEE Transactions on Systems, Man, and Cybernetics*, vol. 20, No. 1, Jan./Feb. 1990, pp. 45-48.

P.R. Chevillat et al.; "Noise-Predictive Partial-Response Equalizers and Applications," IEEE ICC 1992 Conference Record, Jun. 1992, pp. 942-947.

(Continued)

*Primary Examiner*—Shuwang Liu
*Assistant Examiner*—Gina McKie
(74) *Attorney, Agent, or Firm*—Westman, Champlin & Kelly, P.A.

(57) ABSTRACT

A channel detector includes a belief propagation detector that is coupled to a channel and adapted to receive a channel output and to generate tentative bit decisions based in part on the channel output. The channel detector further includes a causal and anti-causal channel output module coupled to the belief propagation detector and adapted to generate causal and anti-causal channel outputs based on the tentative bit decisions. The channel detector also includes a noise prediction module coupled to the causal and anti-causal channel output module and adapted to predict noise samples based on a difference between the channel output and the causal and anti-causal channel outputs. Further, the channel detector includes a noise prediction module adapted to whiten the channel output with the predicted noise samples and to return the whitened channel output to the belief propagation detector to generate new tentative bit decisions.

18 Claims, 11 Drawing Sheets

OTHER PUBLICATIONS

Eleftheriou, E. & Hirt, W.; "Noise-Predictive Maximum-Likelihood (NPML) Detection for the Magnetic Recording Channel," Communications, 1996, ICC '96 Conference Record, IEEE International Conference on Converging Technologies for Tomorrow's Applications, Jun. 1996, pp. 556-560.

N. Al-Dhahir et al.; "Stable Pole-Zero Modeling of Long FIR Filters with Application to the MMSE-DFE," *IEEE Transactions on Communications*, vol. 45, No. 5, May 1997, pp. 508-513.

R. McEliece et al.; "Turbo Decoding as an Instance of Pearl's 'Belief Propagation' Alogorithm," *IEEE Journal on Selected Areas in Communications*, vol. 16, No. 2, Feb. 1998, pp. 140-152.

Eleftherious, E. & Hirt, W.; "Improving Performance of PRML/EPRML through Noise Prediction," *IEEE Transactions on Magnetics*, vol. 32, No. 5, Sep. 1996, pp. 3968-3970.

J.D. Coker et al.; "Noise-Predictive Maximum Likelihood (NPML) Detection," *IEEE Transactions on Magnetics*, vol. 34, No. 1, Jan. 1998, pp. 110-117.

Meshkat, P. & Villasenor, J.D.; "Generalized Versions of Turbo Decoding in the Framework of Bayesian Networks and Pearl's Belief Propagation Algorithm," ICC 1998—IEEE Int'l Conference on Communications, No. 1, Jun. 1998, pp. 121-125.

J.G. Proakis.; "Equalization Techniques for High-Density Magnetic Recording," *IEEE Signal Processing Magazine*, Jul. 1998, pp. 73-82.

M. Fossorier et al.; "Reduced Complexity Iterative Decoding of Low-Density Parity Check Codes Based on Belief Propagation," *IEEE Transactions on Communications*, vol. 47, No. 5, May 1999, pp. 673-680.

Moision, B. & Siegel, P.; "Distance Enhancing Constraints for Noise Predictive Maximum Likelihood Detectors," GLOBECOM 1998, IEEE Global Telecommunications Conference, vol. 5, pp. 2730-2735.

Ping, L. & Leung, W.K.; "Decoding Low Density Parity Check Codes with Finite Quantization Bits," *IEEE Communications Letters*, vol. 4, No. 2, Feb. 2000, pp. 62-64.

Sason, I. & Shamai, S.; "Improved Upper Bounds on the Ensemble Performance of ML Decoded Low Density Parity Check Codes," *IEEE Communications Letters*, vol. 4, No. 3, Mar. 2000, pp. 89-91.

Kim, Y. & Moon, J.; "Noise-Predictive Maximum-Likelihood Method Combined with Infinite Impulse Equalization," *IEEE Transactions on Magnetics*, vol. 35, No. 6, Nov. 1999, pp. 4538-4543.

Kim, S. & Wicker, S.; "Improved Turbo Decoding through Belief Propagation," *Communication Theory*, Global Telecommunications Conference, Globecom '99, pp. 2597-2601.

R. Lucas et al.; "Iterative Decoding of One-Step Majority Logic Decodable Codes Based on Belief Propagation," *IEEE Transactions on Communications*, vol. 48, No. 6, Jun. 2000, pp. 931-937.

M. Tuchler et al.; "Iterative Correction of ISI via Equalization and Decoding with Priors," Proc. Intern. Symposium on Information Theory, Sorrento, Italy, ISIT 2000, Jun. 25-30, 2000, p. 100.

G. Battail.; "On Gallager's Low-Density Parity-Check Codes," Proc. Intern. Symposium on Information Theory, Sorrento, Italy, ISIT 2000, Jun. 25-30, 2000, p. 202.

Weiss, Y. & Freeman, W.; "On the Optimality of Solutions of the Max-Product Belief-Propagation Algorithm in Arbitrary Graphs," *IEEE Transactions on Information Theory*, vol. 47, No. 2, Feb. 2001, pp. 736-744.

Rusmevichientong, P. & Van Roy, B.; "An Analysis of Belief Propagation on the Turbo Decoding Graph with Gaussian Densities," *IEEE Transaction on Information Theory*, vol. 47, No. 2, Feb. 2001, pp. 745-765.

M. Luby et al.; "Improved Low-Density Parity-Check Codes Using Irregular Graphs," *IEEE Transactions on Information Theory*, vol. 47, No. 2, Feb. 2001, pp. 585-598.

Moon, J. & Park, J.; "Pattern-Dependent Noise Prediction in Signal-Dependent Noise," *IEEE Journal on Selected Areas in Communications*, vol. 19, No. 4, Apr. 2001, pp. 730-743.

Burshtein, D. & Miller, G.; "Bounds on the Performance of Belief Propagation Decoding," Proc. Intern. Symposium on Information Theory, ISIT 2001, Washington, DC, Jun. 24-29, 2001, p. 3.

Litsyn, S. & Shevelev, V.; "Distance Distributions in Ensembles of Low-Density Parity-Check Codes," Proc. Intern. Symposium on Information Theory, ISIT 2001, Washington, DC, Jun. 24-29, 2001, p. 49.

Despotovic, M. & Vasic, B.; "Hard Disk Drive Recording and Data Detection," Telsiks 2001, $5^{th}$ International Conference on Telecommunications in Modern Satellite, Cable and Broadcasting Service, 2001, vol. 2, pp. 555-561.

Echard, R. & Chang, S.; "The $\pi$-Rotation Low-Density Parity Check Codes," Globecom 2001—IEEE Global Telecommunications Conference, Nov. 2001, No. 1, pp. 980-984.

Chen, J. & Fossorier, M.; "Near Optimum Universal Belief Propagation Based Decoding of Low-Density Parity Check Codes," *IEEE Transactions on Communications*, vol. 50, No. 3, Mar. 2002, pp. 406-414.

B. Kurkoski et al.; "Joint Message-Passing Decoding of LDPC Codes and Partial-Response Channels," *IEEE Transactions on Information Theory*, vol. 48, No. 6, Jun. 2002, pp. 1410-1422.

Vasic, B. & Djordjevic, I.; "Low-Density Parity Check Codes for Long-Haul Optical Communication Systems," *IEEE Photonics Technology Letters*, vol. 14, No. 8, Aug. 2002, pp. 1208-1210.

A. Minagawa et al.; "Region Extraction Based on Belief Propagation for Gaussian Model," $16^{th}$ international Conference on Pattern Recognition, 2002. Proceedings, vol. 2, pp. 507-510.

M. Wainwright et al.; "Tree-based Reparameterization analysis of belief propagation and related algorithms for approximate inference on graphs with cycles," Proc. Intern. Symposium on Information Theory, ISIT 2002, Lausanne, Switzerland, Jun. 30-Jul. 5, 2002, p. 113.

R. Gallager.; *Low-Density Parity-Check Codes*, (M.I.T. Press) Cambridge, Mass.; 1963, book review.

R. Gallager.; "Low-Density Parity-Check Codes," *IRE Transactions on Information Theory*, 1962, pp. 21-28.

L. Yin et al.; "Modified Belief-Propagation Algorithm for Decoding of Irregular Low-Density Parity-Check Codes," *Electronic Letters*, Nov. 2002, vol. 38, No. 35, pp. 1551-1553.

E. Sharon.; "Analysis of Belief-Propagation Decoding of LDPC Codes over the biAWGN Channel Using Improved Gaussian Approximation Based on the Mutual Information Measure," $22^{nd}$ Convention of Electrical and Electronics Engineers in Israel, 2002, pp. 262-264.

J. Heo.; "Analysis of Scaling Soft Information on Low Density Parity Check Code," *Electronics Letters*, Jan. 2003, pp. 219-221.

J. Liu et al.; "Symbol Timing Recovery for Low-SNR Partial Response Recording Channels," Globecom 2002—IEEE Global Telecommunications Conference, vol. 21, No. 1, Nov. 2002, pp. 1129-1136.

Zhang, J. & Fossorier, M.; "Shuffled Belief Propagation Decoding," Conference Record of the $36^{th}$ Asilomar Conference on Signals, Systems and computers, vol. 1, pp. 8-15.

J. Sun et al.; "Stereo Matching Using Belief Propagation," *IEEE Transactions on Pattern Analysis and Machine Intelligence*, vol. 25, No. 7, Jul. 2003, pp. 787-800.

Shun-ichi Amari.; "Information Geometry of Neural Learning and Belief Propagation," Keynote Speeches, Proceedings of the 9th Int'l Conf. On Neural Information Processing, vol. 2, '02, pp. 886-887.

Ha, J. & McLaughlin, S.; "Low-Density Parity-Check Codes Over Gaussian Channels with Erasures," *IEEE Transactions on Information Theory*, vol. 39, No. 7, Jul. 2003, pp. 1801-1809.

B. Kurkoski et al.; Correction to "Joint Message-Passing Decoding on LDPC Codes and Partial-Response Channels," *IEEE Transactions on Information Theory*, Aug. 2003, pp. 2076.

Barnault, L. & Declercq, D.; Fast Decoding Algorithm for LDPC over GF ($2^q$), Proceedings 2003 IEEE Information Theory Workshop, Paris, France, Mar. 31-Apr. 4, 2003, pp. 70-73.

J. Yedidia et al.; "Representing Codes for Belief Propagation Decoding," , Proc. Intern. Symposium on Information Theory, ISIT 2003, Yokohama, Japan, Jun. 29-Jul. 4, 2003, p. 176.

Excerpt. C. Woo et al.; "A Noise-Predictive Partial Response Decision-Feedback Equalizer for RLL (1,x) Coded Perpendicular Magnetic Recording Channels," INTERMAG 2003, IEEE International Conference on Magnetics 2003, p. DT-05.

Excerpt. S. Marukawa et al.; "Performance of NPML System in Helical Scanning Azimuth Recording Channel," INTERMAG 2003, IEEE International Conference on Magnetics 2003, p. DT-21.

C. Woo et al.; "A Dual Noise-Predictive Partial Response Decision-Feedback Equalizer for RLL (1,x) Coded Perpendicular Magnetic Recording Channels," *IEEE Transactions on Magnetics*, vol. 39, No. 5, Sep. 2003, pp. 2561-2563.

Tappen, M. & Freeman, W.; "Comparison of Graph Cuts With Belief Propagation for Stereo, using Identical MRF Parameters," Proceedings of the 9th IEEE Int'l Conf. On Computer Vision, ICCV 2003, pp. 1-8.

M. Yazdani et al.; "Improving Belief Propagation on Graphs With Cycles," *IEEE Communication Letters*, vol. 8, No. 1, Jan. 2004, pp. 57-59.

Zhang, J. & Fossorier, M. "A Modified Weighted Bit-Flipping Decoding of Low-Density Parity-Check Codes," *IEEE Communication Letters*, vol. 8, No. 3, Mar. 2004, pp. 165-167.

Felzenszwalb, P. & Huttenlocher, D.; "Efficient Belief Propagation for Early Vision," Proceedings of the 2004 IEEE Computer Society Conf. On Computer Vision and Pattern Recognition, 2004, pp. 1-8.

Lee, W. & Delfyett, P.J.; "Dual-Mode Injection Locking of Two Independent Modelocked semiconductor Lasers," *Electronics Letters*, vol. 40, No. 19, 2004, pp. 1-2.

J. Garcia-Frias.; "Decoding of Low-Density Parity-Check Codes Over Finite-State Binary Markov Channels," *IEEE Transactions on Communications*, vol. 52, No. 11, Nov. 2004, pp. 1840-1843.

O. Etesami.; "Relations Between Belief Propagation on Erasure and Symmetric Channels," Proc. Intern. Symposium on Information Theory, ISIT 2004, Chicago, IL., Jun. 27-Jul. 2, 2004, p. 207.

Zarrinkhat, P. & Banihashemi, A. "Threshold Values and Convergence Properties of Majority-Based Algorithms for Decoding Regular Low-Density Parity-Check Codes," *IEEE Transactions on Communications*, vol. 52, No. 12, Dec. 2004, pp. 2087-2097.

Lee, J. * Lee, J.; "A Simplified Noise-Predictive Partial Response Maximum Likelihood Detection Using M-Algorithm for Perpendicular Magnetic Recording Channels," *IEEE Transactions on Magnetics*, 2005, pp. 1-3.

J. Yedidia et al.; "Understanding Belief Propagation and its Generalizations," Exploring Artificial Intelligence in the New Millennium, ISBN 1558608117, Chap. 8, Jan. 2003, 33 pages.

Dechter, R. & Mateescu, R.; "A Simple Insight Into Iterative Belief Propagation's Success," in proceedings of UAI-03, Acapulco, Mexico, 2002, pp. 128-136.

E. Sudderth et al.; "Nonparametric Belief Propagation," 2003 IEEE Conference on Computer Vision and Pattern Recognition, 2003—pp. 1-8.

M. Fossorier et al.; "Reduced Complexity Iterative Decoding of Low-Density Parity Check Codes Based on Belief Propagation," *IEEE Transactions on Communications*, vol. 47, No. 5, May 1999, pp. 673-680.

* cited by examiner

METHOD AND APPARATUS FOR INTERATIVE NOISE WHITENING WITH CAUSAL AND ANTI-CAUSAL PREDICTION FILTERS

BACKGROUND OF THE INVENTION

The present disclosure relates to data encoders, decoders, equalizers and detectors for use with communication channels, and more particularly, to systems and methods for data detection over inter-symbol interference channels with correlated noise.

Storage/retrieval systems and data transmission systems often utilize detection/decoding schemes for data detection due to the presence of inter-symbol interference (ISI). Noise encountered in magnetic recording channels typically has two components, electronic noise and media noise. The electronic noise does not depend on data patterns. However, the media noise (jitter) that arises from deviations in the position and width of transition pulses is pattern dependent. Media noise is more severe when there are more transitions in the signal pattern. Consequently, noise in magnetic recording channels is pattern dependent. Moreover, the noise seen by a channel detector is correlated due to "partial response equalization", which is employed to decrease the complexity of the channel detector.

To detect information from ISI channels, channel detectors often utilize a trellis-based maximum a-posteriori (MAP) algorithm, a Viterbi algorithm, or a soft output Viterbi algorithm (SOVA). For coded systems, a soft output detector, such as a MAP-based detector, a SOVA detector, and the like, are typically used. The soft output detector applies an algorithm that assumes that the noise on the ISI channel is white Gaussian while computing the soft channel outputs.

Belief propagation (BP) based soft-input soft-output (SISO) detectors have been proposed to detect ISI channels with additive white Gaussian noise as an alternative to MAP and Viterbi-based channel detectors. Generally, belief propagation has been employed in artificial intelligence systems and is known as a message passing (sum/product) algorithm. Typically, belief propagation works on a factor graph while calculating a posterior probabilities of channel inputs, and it assumes the presence of additive white Gaussian noise. However, not all ISI channels have additive white Gaussian noise. For example, magnetic recording channels that are equalized to a partial response (PR) target have correlated noise due to the linear equalizer used to shape the channel impulse response (partial-response equalization).

There is an ongoing need for data detection systems and methods that can detect data on both coded and uncoded channels, such as magnetic recording systems. Some of the embodiments of the present invention address these and other problems in the prior art, and provide advantages of conventional systems.

SUMMARY OF THE INVENTION

A channel detector has a belief propagation detector, a causal and anti-causal channel output module, and a noise prediction module. The belief propagation detector is coupled to a channel and is adapted to receive a channel output. The belief propagation detector is adapted to generate tentative bit decisions based in part on the channel output. The causal and anti-causal channel output module is coupled to the belief propagation detector and is adapted to generate causal and anti-causal channel outputs based on the tentative bit decisions. The noise prediction module is coupled to the causal and anti-causal channel output module and is adapted to predict noise samples based on a difference between the actual channel output and the causal and anti-causal channel outputs. The noise prediction module is adapted to whiten the channel output with the predicted noise samples and to return the whitened channel output to the belief propagation detector to generate new tentative bit decisions.

In one embodiment, a method for detecting information from an ISI channel is provided. Tentative bit decisions are generated with a belief propagation detector based on a received channel output. Tentative channel outputs are generated by a causal and anti-causal channel output module based on the tentative bit decisions. Noise samples are predicted by a noise prediction module based on a difference between the tentative channel outputs and the received channel output. The noise prediction module whitens the received channel output to form a whitened channel output using the predicted noise samples. New tentative bit decisions are generated by the belief propagation detector using the whitened channel output.

In another embodiment, a storage device has a storage medium, a read-write mechanism, and a channel detector. The read-write mechanism is coupled to the storage medium. The channel detector is coupled to the read-write mechanism and is adapted to detect a channel output sequence from a channel. The channel detector has a belief propagation detector, a causal and anti-causal output module, and a noise prediction module. The belief propagation detector is coupled to the channel and is adapted to generate tentative bit decisions based on the channel output sequence. The causal and anti-causal output module is coupled to the belief propagation detector and is adapted to generate tentative channel outputs based on the tentative bit decisions. A noise prediction module is coupled to the causal and anti-causal output module and to the belief propagation detector. The noise prediction module is adapted to predict noise based on the channel output sequence and the tentative channel outputs and to generate a whitened channel output sequence based on the predicted noise. The noise prediction module is adapted to return the whitened channel output sequence to the belief propagation detector.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
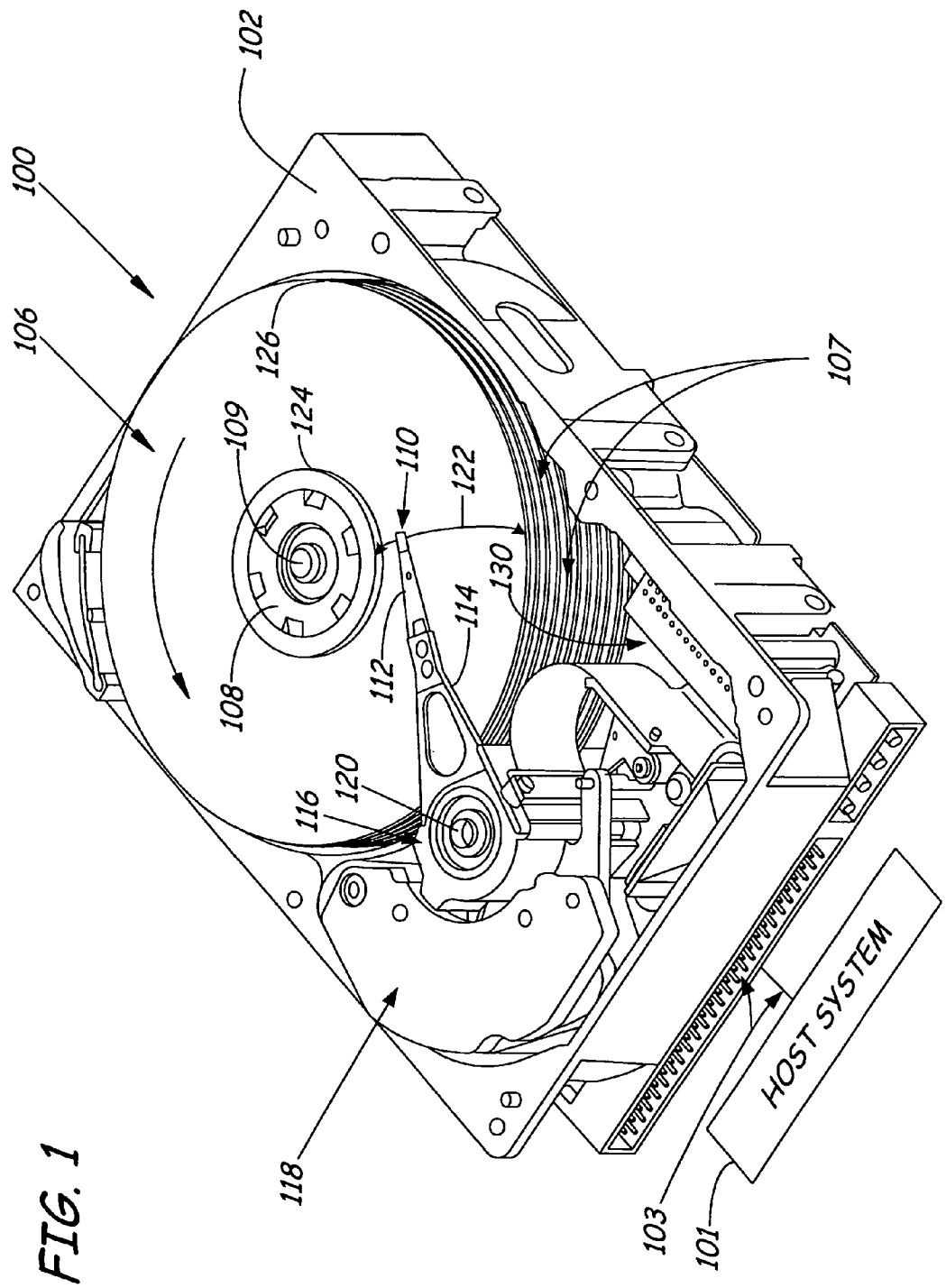
FIG. 1 is an isometric view of a disc drive on which embodiments of the present invention may be employed.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 to which a read/write transducer (not shown) is mounted, for communication with the disc surface.

In the example shown in FIG. 1, disc head sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached disc head sliders 110 (and associated read/write transducers) about a pivot shaft 120 to position the disc head slider 110 over a desired data track along an arcuate path 122 between a disc inner diameter 124 and a disc outer diameter 126. Voice coil motor 118 is driven by electronics 130 based on signals generated by heads 110 and a host system 101. The host system 101 is coupled to the disc drive 100 via an interface 103. Data and control signals pass from the host system 101 to the disc drive 100 over the interface 103.

Generally, channel detectors are utilized on various communication channels, including channels in storage devices, for improving accuracy of data detection. Embodiments of the present invention apply the belief propagation (BP) algorithm to ISI channels having correlated noise, such as magnetic recording channels that are equalized to a PR target. Due to this partial response equalization, the additive noise on the channel is not white Gaussian noise. As used herein, the term "belief propagation" refers to an iterative algorithm that is based on information exchange between variable nodes (representing the ISI channel input bits) and function nodes (representing the ISI channel output bits). At each iteration, the variable nodes pass their a-priori information to the connected function nodes, which then use the a-priori information as well as channel outputs and the ISI channel constraints to calculate an a-posteriori probability for the connected variable nodes. The function nodes pass this information to the variable nodes, which then update their a-priori information. After a number of iterations, the bit decisions are made.

Figure 2:
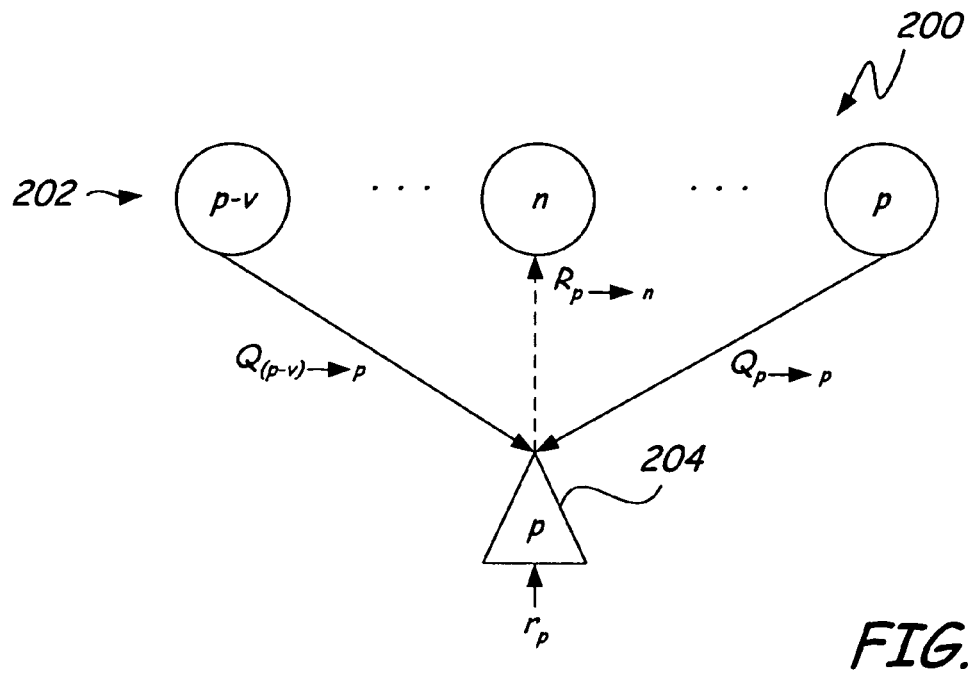
FIG. 2 is a simplified block diagram illustrating information transfer from function node p to variable node n according to an embodiment of the present invention.

FIG. 2 depicts a simplified factor graph segment 200 illustrating information transfer from a function node (p) to a variable node (n) according to an embodiment of the present invention. The factor graph 200 includes a plurality of variable nodes (generally indicated by reference numeral 202) and a single function node 204. The variable nodes 202 range from p to p–v, where v+1 is the channel length or ISI span. An edge between the nodes represents a conditional dependency. At each iteration, the variable nodes 202 pass their a-priori information (represented as a function $Q_p$) to the connected function nodes (such as function node 204).

Function node (p) 204 receives a noisy channel sample $r_p$. The function node 204 then uses the a-priori information, as well as the ISI channel constraints, to compute the a-posteriori probability $R_{p \to n}(j) = P[x_n = j | r_p]$ for every connected variable node (n) 202. Representing the ISI channel realization as $$H(D) = \sum_{i=0}^{v} h_i \cdot D^i,$$

the computation proceeds as follows. For j=0 and 1, the probabilities $P[x_n=j, x_{p-v}^{p \backslash n}=(j_1, j_2, \ldots, j_v)|r_p]$ are summed over $j_1, j_2, \ldots, j_v$ from the channel input alphabet {0,1}. For this computation, $P[x_n=j, x_{p-v}^{p \backslash n}=(j_1, j_2, \ldots, j_v)|r_p]$ is partitioned into $P[r_p|x_n=j, x_{p-v}^{p \backslash n}=(j_1, j_2, \ldots, j_v)]$ and the extnnsic a-priori information $P[x_{p-v}^{p \backslash n}]$, where $x_{p-v}^{p \backslash n}$ denotes the variable nodes with indices p–v to p, except variable node n.

The probability $P[r_p|x_n=j, x_{p-v}^{p \backslash n}=(j_1, j_2, \ldots, j_v)]$ is calculated assuming that the additive noise is white Gaussian. The extrinsic a-priori probability $P[x_{p-v}^{p \backslash n}]$ is calculated by multiplying all of the incoming extrinsic a-priori information passed to the function node from all connected variable nodes, except for the variable node n for which $P[x_n=j|r_p]$ is being computed. The computation proceeds as follows:

$$\begin{aligned} R_{p \to n}(j) &= P[x_n = j | r_p] \quad &\text{(Equation 1)} \\ &= \sum_{j_1, j_2, \ldots, j_v} [x_n = j, x_{p-v}^{p \backslash n} = (j_1, j_2, \ldots j_v) | r_p] \\ &= \sum_{j_1, j_2, \ldots, j_v} \frac{P[r_p | x_n = j, x_{p-v}^{p \backslash n} = (j_1, j_2, \ldots j_v)] \cdot P[x_{p-v}^{p \backslash n}]}{P[r_p]} \\ &\propto \sum_{j_1, j_2, \ldots, j_v} P[r_p | x_n = j, x_{p-v}^{p \backslash n} = (j_1, j_2, \ldots j_v)] \cdot P[x_{p-v}^{p \backslash n}] \end{aligned}$$

$$\propto \sum_{j_1, j_2, \ldots j_v} P[r_p \mid x_n = j, x_{p-v}^{p\backslash n} = (j_1, j_2, \ldots j_v)] \cdot \prod_{k=p-v}^{p\backslash n} Q_{k \to p}(j_k).$$

Assuming that all incoming information is independent, which is the case when the factor graph is cycle free, the extrinsic a-priori information can be calculated by $$P[x_{p-v}^{p\backslash n}] = \prod_{k=p-v}^{p\backslash n} Q_{k \to p}(j_k),$$

where $Q_{k \to p}(j_k)$ represents the a-priori information k=p−v passed from variable node (k) 202 to function node (p) 204. However, if there is a cycle in the factor graph, the incoming a-priori information $Q_{k \to p}(j_k)$ from the connected nodes is correlated. Therefore, the expression $$P[x_{p-v}^{p\backslash n}] = \prod_{k=p-v}^{p\backslash n} Q_{k \to p}(j_k)$$

is only approximate.

The function node 204 passes the calculated a-posteriori probability information to the variable node (n) 202, which then updates its a-priori information. After a number of iterations (or after the probabilities converge), the detector makes the bit decisions. It should be understood that the a-posteriori information transfer $R_{p \to n}(j) = P[x_n = j \mid r_p]$, from the function node CD) 204 to the variable node (n) 202, is based on the extrinsic a-priori information Q passed from the variable nodes connected to the function node (p), except the variable node (n).

Figure 3:
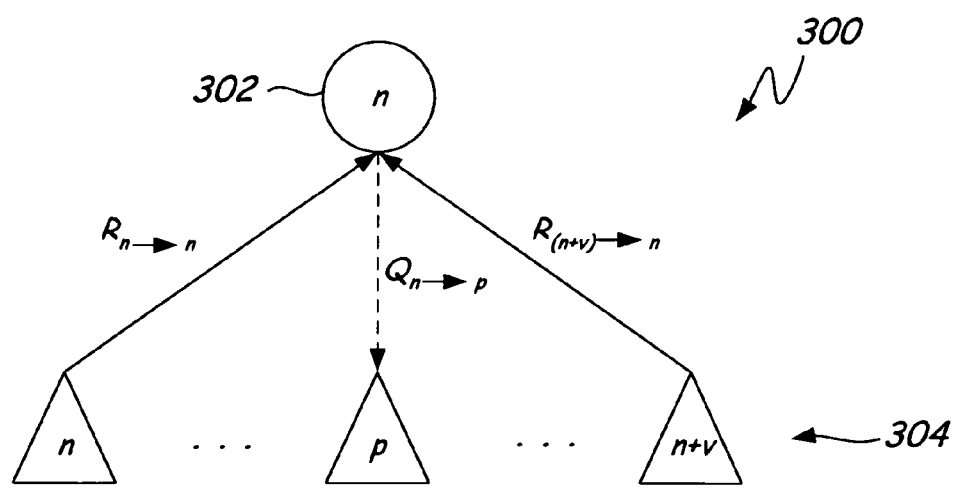
FIG. 3 is a simplified block diagram illustrating information transfer from variable node n to function node p according to an embodiment of the present invention.

FIG. 3 is a simplified factor graph segment 300 illustrating extrinsic information transfer from variable node (n) to function node (p), based on the a-posteriori information passed from the function nodes, except for function node (p), according to an embodiment of the present invention. The node diagram 300 includes variable node 302 and a plurality of function nodes (generally indicated by reference numeral 304), ranging from function node (n) to function node (n+v), where v+1 is the channel length. In this instance, function nodes 304, except for function node (p), pass their a-posteriori information ($R_{n \to n}, \ldots, R_{n+v \to n}$) to the variable node (n), which updates its a-priori information, and transfers the updated a-priori information ($Q_{n \to p}$) to function node (p).

In general, after receiving the a-posteriori information $P[x_n = j \mid r_p]$ from the connected function nodes, variable node (n) generates the extrinsic a-priori probability $Q_{n \to p}(j)$ for function node (p) by multiplying all $P[x_n = j] = R_{k \to n}(j)$ except n=p. The a-priori probability is calculated as follows:

$$Q_{n \to p}(j) = \frac{\prod_{k=n}^{(n+v)\backslash p} R_{k \to n}(j)}{\prod_{k=n}^{(n+v)\backslash p} R_{k \to n}(1) + \prod_{k=n}^{(n+v)\backslash p} R_{k \to n}(0)}, \quad \text{(Equation 2)}$$

where (n+v)|p denotes the list of all function nodes connected to variable node (n), except function node (p). After a fixed number of iterations, variable node (n) receives all the incoming information from the connected function nodes and calculates $P[x_n = j]$ using equation 2, without excluding any incoming information. A final hard decision is then made based on $P[x_n = j]$. It should be understood that the belief propagation algorithm can be readily implemented in the log domain as well.

Compared to trellis-based detection systems, the BP-based detection system of the present invention as applied to ISI channels with correlated noise provides a number of advantages. First, the BP-based detector can apply the BP algorithm to received bits in parallel, thereby reducing computation time. The significance of the parallel structure lies in the fact that scheduling is not an issue for algorithms having parallel structures, and thus the parallel property is advantageous for practical implementations. Second, the decoding delay for a BP detector is much shorter than that of the MAP detector, which reduces memory requirements for the BP-based detector significantly. Complexity increases exponentially in a BP-based system only with the number of non-zero channel taps, facilitating efficient complexity reduction techniques. Moreover, unlike noise predictive maximum likelihood detectors where the local decision feedback is based on the tentative bit decisions obtained from the surviving path of each state, the noise predictive belief propagation channel detector of the present invention employs global decision feedback resulting in a single whitened channel output for all bit nodes. The whitened channel output is computed using the decoded bit sequence obtained at the end of every iteration. Consequently, the noise predictive belief propagation channel detector of the present invention uses global decision feedback, which results in faster and simplified hardware implementations.

If the factor graph of the ISI channel is cycle free (where a "cycle" refers to a closed loop starting and ending at the same node), for each user bit the BP algorithm calculates the a-posteriori probabilities correctly, and optimal MAP performance is achieved. Although factor graphs of the ISI channels typically contain cycles, in practice, the BP algorithm achieves near optimal performance provided that the factor graphs do not contain short cycles, such as cycles with a length of four.

Figure 4:
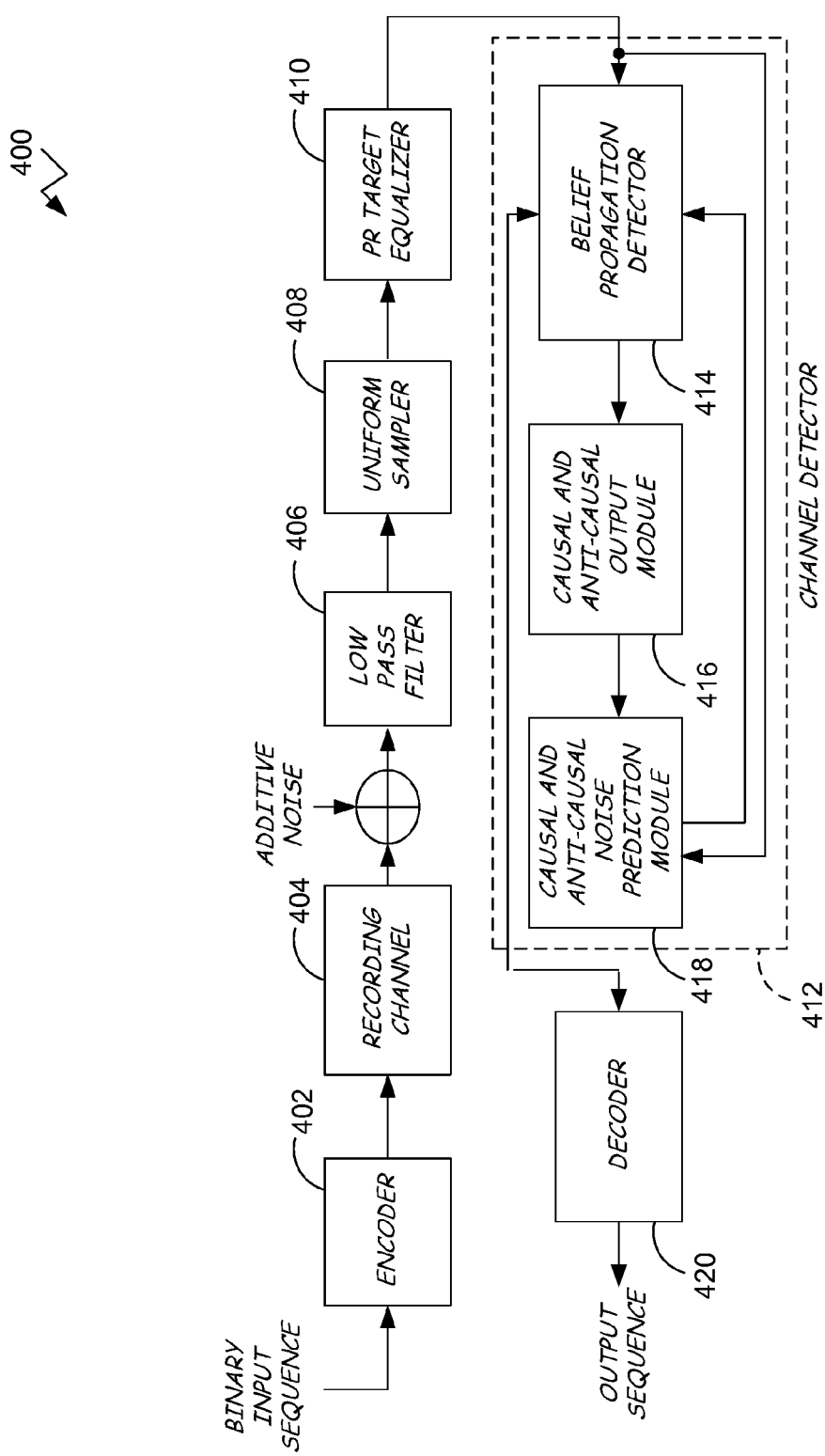
FIG. 4 is a simplified block diagram of a coded system for recording data to and detecting data from a recording channel according to an embodiment of the present invention.

FIG. 4 is a simplified block diagram of a noise predictive BP system 400 according to an embodiment of the present invention. The system 400 includes an encoder 402, which is coupled to a recording channel 404 and which encodes binary input sequences for recording onto the recording channel 404. Typically, the encoder uses a low density parity check (LDPC) code to obtain the coded bit sequence. The coded bits are modulated and written onto the magnetic recording channel (or recording medium) by generating a write current through a read/write head. Encoded data and additive noise are received from the recording channel 404 by a low pass filter 406. The low pass filter 406 passes the information through a uniform sampler 408 to a PR target equalizer 410. Since the longitudinal recording channel has a very long ISI span, in order to reduce the complexity of the channel detector, the channel is equalized to a PR target.

The additive correlated noise for the recording channel is composed of the white noise filtered through the PR target equalizer 410 and the residual interference. The output of the PR target equalizer 410 is passed to the channel detector 412 (also referred to as a noise predictive belief propagation detector or NPBP detector). The channel detector 412 includes a BP detector 414, a causal and anti-causal channel output module 416, and a causal and anti-causal noise prediction module 418. Finally, the channel detector 412 passes the detected information to the decoder 420, which generates the decoded output sequence.

Within the channel detector 412, the BP detector 414 receives the correlated data from the PR target equalizer 410 (channel output) and generates tentative bit decisions using the soft log likelihood information generated at the end of each BP iteration. The causal and anti-causal channel output module 416 then uses the tentative bit decisions generated by the BP detector 414 to generate the causal and anti-causal channel outputs (past and future bit decisions, respectively). More specifically, the causal and anti-causal channel output module 416 obtains hard bit decisions from log likelihood ratios computed by the BP detector 414 and generates ISI channel outputs (causal and anti-causal) corresponding to the hard bit decisions. The causal and anti-causal noise prediction filter module 418 receives the tentative ISI channel outputs (causal and anti-causal) from the causal and anti-causal channel output module 416 and predicts the noise samples. More specifically, the noise prediction module 418 finds the noise samples from a difference between the channel output and the ISI channel outputs (causal and anti-causal) obtained from the causal and anti-causal channel output module 416. The noise prediction module 418 then uses the predicted noise to whiten the channel output, which is fed back to the BP detector 414. The channel detector 412 can repeat the detection and noise whitening process over several iterations, until a predetermined number of iterations have been performed.

Unlike conventional detectors which rely only on past (causal) noise samples, the channel detector 412 of the present invention uses both past and future bit information (tentative causal and anti-causal outputs), which enhances the bit-error rate (BER) performance significantly. Moreover, by whitening the output bits based on the causal and anti-causal information, the BP detector 414 can assume that additive white Gaussian noise is present in the whitened bit sequence.

In one embodiment, it is assumed that the recording channel is equalized to the PR4 target (H(D)=[1 0 −1]). For this case, the output ($r_n$) of the linear PR target equalizer (input of the channel detector) 410, corresponding to the channel input ($x_n$) is given as follows:

$$r_n = x_n - x_{n-2} + w_n \quad \text{(Equation 3)}$$

where $w_n$ represents the additive total distortion, which is composed of the additive white noise filtered by the PR target equalizer 410 plus any residual interference. Ignoring the media noise, the signal-to-noise ratio (SNR) is defined as $$SNR = \frac{1}{R_c} \frac{\int_{-\infty}^{\infty} p^2(t)\,dt}{N_0/2}$$

where $R_c$ is the code rate, $N_0/2$ is the two-sided additive white noise power spectral density, and $p(t)$ is the di-pulse response of the channel.

Noise prediction (NP) for belief propagation proceeds as follows. At the end of a particular BP iteration, hard bit decisions are made to obtain $\hat{x}_n$. The sequence of bits is then filtered through the PR target to obtain the corresponding channel output $\hat{r}_n$. If $P(D) = (p_1 D^1 + p_2 D^2 + \ldots + p_N D^N)$ represents the transfer polynomial of a length N finite impulse response (FIR) noise prediction filter, then the total distortion component $e_n$ (also referred to as the prediction error) for the whitened channel output can be given as follows:

$$e_n = w_n - \sum_{k=1}^{N} p_k \cdot \underbrace{(r_{n-k} - \hat{r}_{n-k})}_{w_{n-k}} - \sum_{k=1}^{N} p_{-k} \cdot \underbrace{(r_{n+k} - \hat{r}_{n+k})}_{w_{n+k}}, \quad \text{(Equation 4)}$$

where the equation $\hat{r}_{n-k} = \hat{x}_{n-k} - \hat{x}_{n-k-2}$ represents the ideal PR channel output calculated from the past tentative bit decisions $\hat{x}_{n-k}$ and $\hat{x}_{n-k-2}$, which are obtained at the end of a BP iteration. Similarly, the equation $\hat{r}_{n+k} = \hat{x}_{n+k} - \hat{x}_{n+k-2}$ represents the corresponding PR channel output obtained from the future bit decisions.

Figure 5:
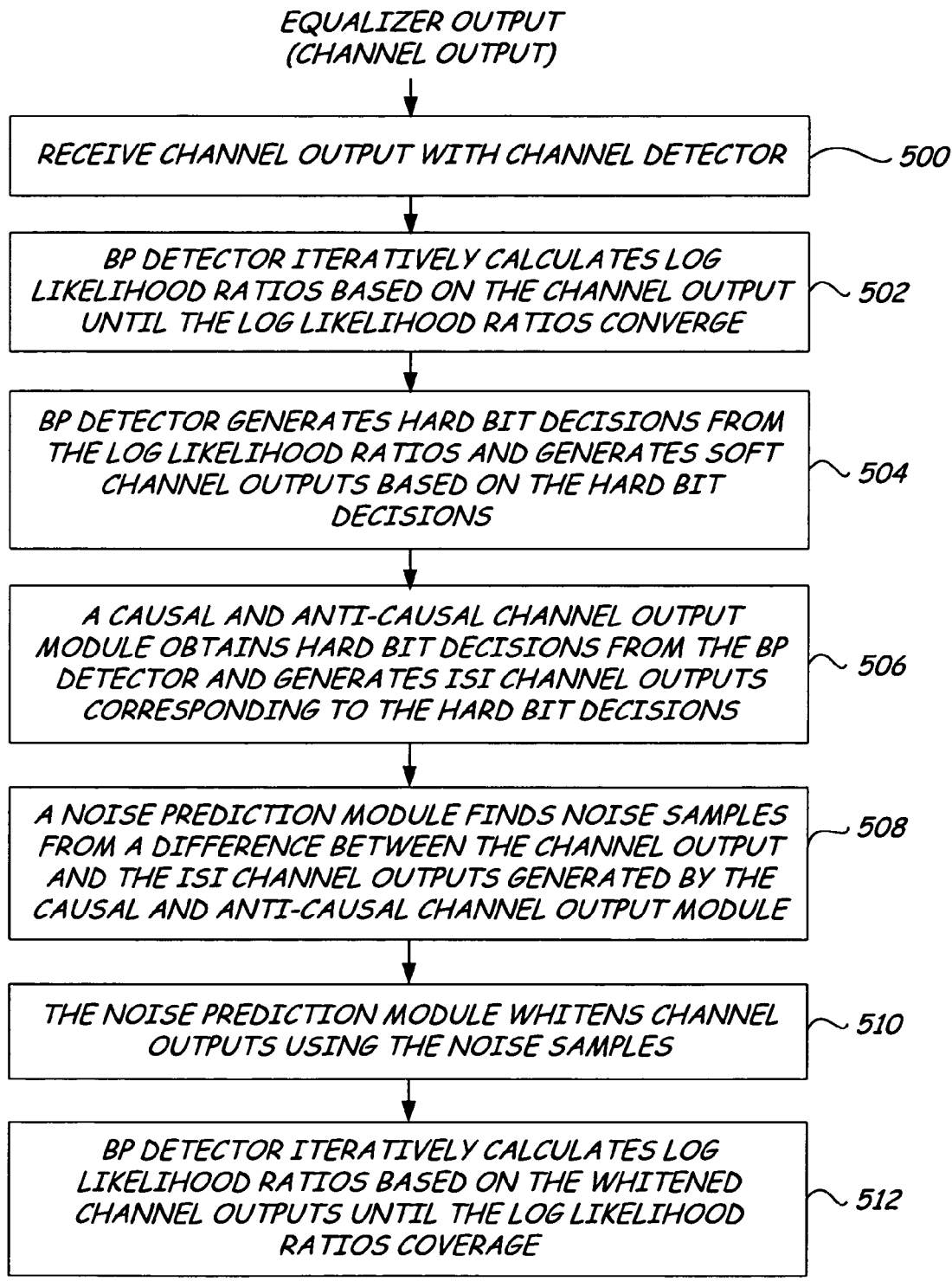
FIG. 5 is a simplified flow diagram of a process for detecting data using a noise predictive belief propagation channel detector according to an embodiment of the present invention.

FIG. 5 is a simplified flow diagram of a process for detecting data using a noise predictive belief propagation channel detector according to an embodiment of the present invention. The channel output is received by the channel detector (step 500). A belief propagation detector iteratively calculates log likelihood ratios based on the channel output until the log likelihood ratios converge (step 502). The BP detector generates hard bit decisions from the log likelihood ratios (step 504). A causal and anti-causal channel output module obtains the hard bit decisions from the BP detector and generates ISI channel outputs corresponding to the hard bit decisions (step 506). A noise prediction module finds noise samples from a difference between the channel output and the ISI channel outputs generated by the causal and anti-causal channel output module (step 508). The noise prediction module then whitens the channel outputs using the noise samples (step 510). Specifically, the noise prediction module uses a noise prediction filter within the module to whiten the channel outputs using the noise samples. The BP detector then iteratively calculates the log likelihood ratios based on the whitened channel outputs until the log likelihood ratios converge (step 512). Steps 504-512 (the "noise prediction" steps) are then repeated several times at subsequent iterations.

To avoid noise propagation caused by incorrect decision feedback, the first noise prediction steps are performed after the log likelihood ratios calculated by the BP detector converge. For example, a BP detector typically converges after 10 iterations for a case of a D=2.86 longitudinal recording channel equalized to a PR4 target.

After processing through steps 504-510, the BP detector typically takes a few iterations to converge (such as 5 iterations for the D=2.86 longitudinal recording channel equalized to a PR4 target). Thus, after each new noise prediction step, the BP detector iteratively generates the hard bit decisions until it converges (step 512). Generally, three to four noise prediction steps 504 through 512 improve the performance significantly, and gains produced through subsequent iterations may be offset by performance considerations, such as latency.

It is important to note that the first time through steps 504-512, the whitened channel output is obtained as follows $$\tilde{r}_n = r_n - \tilde{w}_n$$

where $\tilde{r}_n$ is the whitened channel output, where $r_n$ is the original channel output, and where the whitened channel distortion $\tilde{w}_n$ is calculated using Equation 5 below. At the next iteration of the noise prediction steps, the original channel output $r_n$ is used as the reference, as opposed to using the whitened channel output. Consequently, the predictor coefficients $p_n$ shown in FIG. 7 below are calculated from the autocorrelation of the original total distortion $w_n$ rather than the whitened total distortion $\tilde{w}_n$. Since after each noise prediction step the tentative decisions of the BP detector become more accurate, the noise prediction becomes more accurate as well. Consequently, the BER performance improves after each noise prediction iteration (of steps 504-512).

Figure 6:
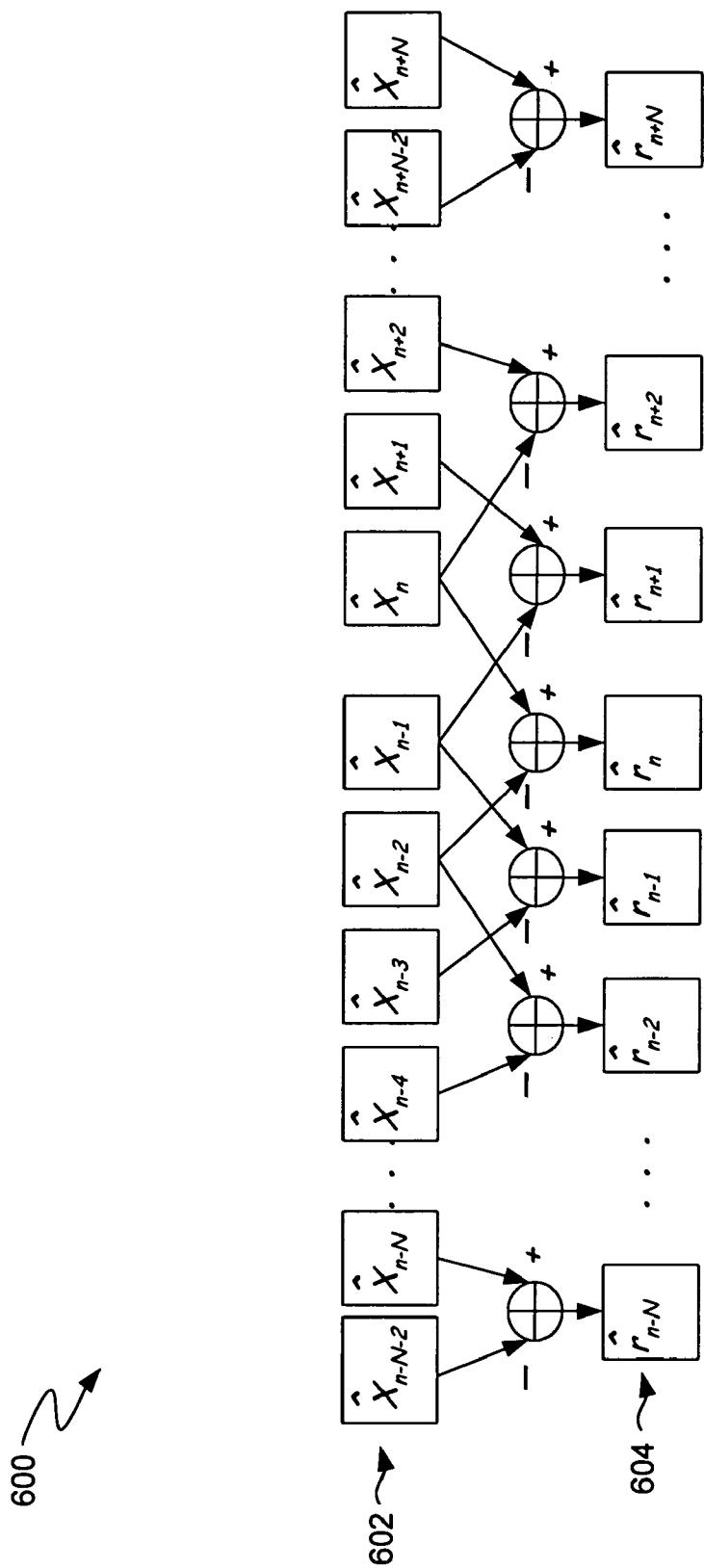
FIG. 6 is a simplified block diagram of an apparatus generating tentative causal and anti-causal channel outputs according to an embodiment of the present invention.

FIG. 6 is a simplified block diagram of a causal and anti-causal channel output module system 600 for generating tentative causal and anti-causal channel outputs from the tentative bit decisions of a BP detector according to an embodiment of the present invention. The system 600 (corresponding to module 416 in FIG. 4) receives tentative bit estimates 602 of the ISI channel inputs, filters the tentative bit estimates 602 through the PR target, and generates corresponding tentative channel output estimates 604. The input index ranges from $\hat{X}_{n-N-2}$ to $\hat{X}_{n+N}$, where $\hat{X}_n$ represents a tentative channel input bit.

Figure 7:
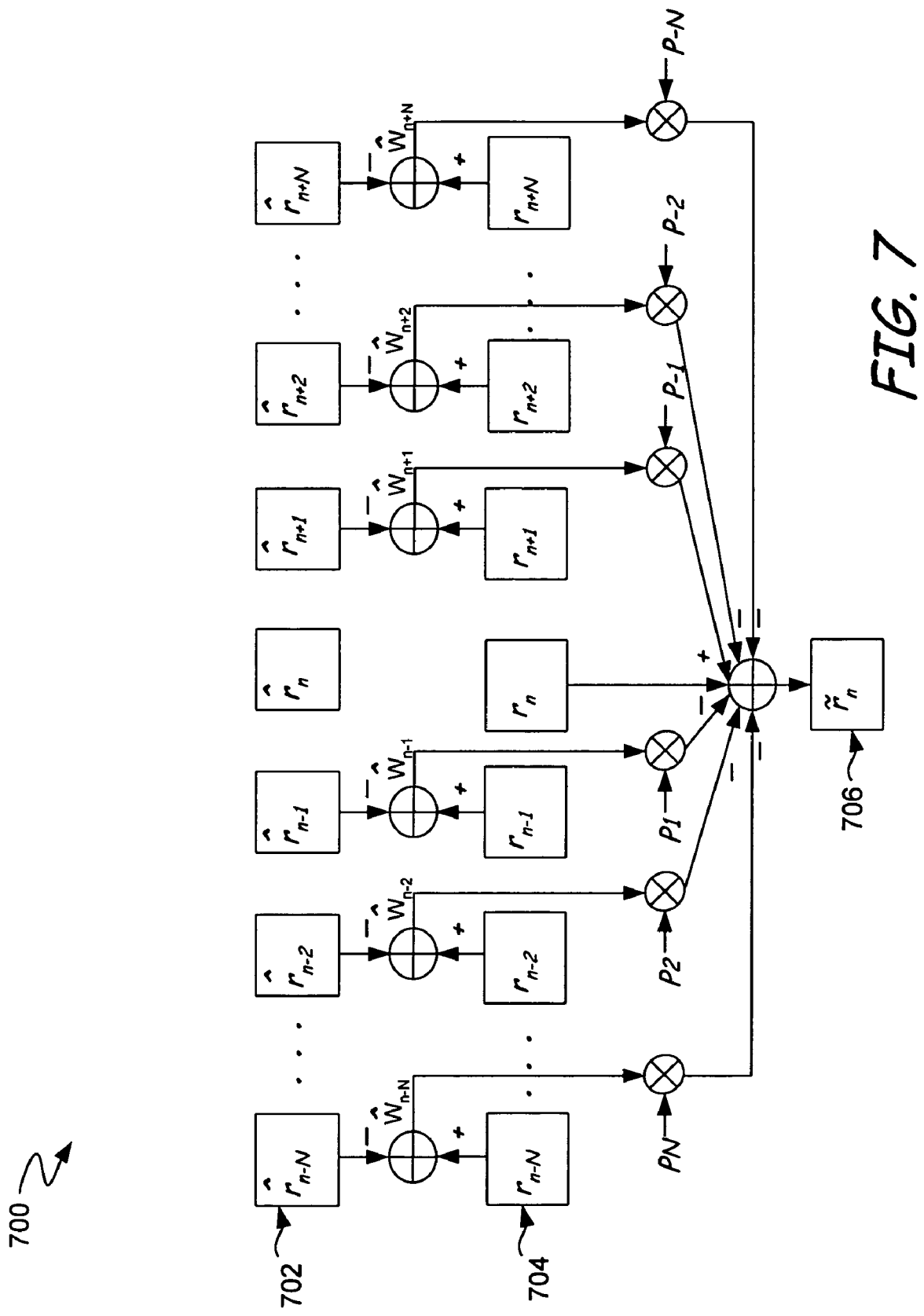
FIG. 7 is a system for generating whitened channel outputs according to an embodiment of the present invention.

FIG. 7 illustrates a causal and anti-causal noise prediction filter module 700 according to an embodiment of the present invention. The causal and anti-causal noise prediction filter module 700 (corresponding to module 418 in FIG. 4) receives the plurality of tentative channel output estimates 702 (corresponding to estimates 604 in FIG. 6). The module 700 subtracts estimates 702 from channel detector input 704, on which the estimates 702 are based, to predict the noise sample $w_k$ for each bit, from n−N<k<n+N. The predicted noise samples $w_k$'s are then multiplied by a noise prediction filter coefficients $p_j$'s for the range N>j>−N. The products are then subtracted from the channel output for which the noise whitening process is performed. In this instance, the system 700 is removing the effects of past and future noise samples from the n-th noise sample. The difference between the value of bit $r_n$ and the calculated errors is whitened channel output $\tilde{r}_n$ (generally indicated by reference numeral 706).

The calculations illustrated in FIGS. 6 and 7 are performed for all bits of the channel detector input sequence, which is the output of the PR target equalizer. The whitened channel output 706 can then be fed back into the BP channel detector to improve the accuracy of the tentative bit decision-making of the BP detector. Subsequent iterations utilize the new whitened sequence for the edge probability computation of the belief propagation algorithm. Since belief propagation, in this embodiment, is an iterative algorithm, noise prediction can be repeated at later iterations with more accurate bit decisions.

Since the BP algorithm has a parallel structure, all bit decisions are accessible at the end of every detection iteration. If the total whitened portion of the additive noise is defined as $$\tilde{w}_n = \sum_{k=1}^{N} p_k \cdot w_{n-k} + \sum_{k=1}^{N} p_{-k} \cdot w_{n+k} = w_n - e_n, \quad \text{(Equation 5)}$$

then the whitened channel output $\tilde{r}_n$ is given as $$\tilde{r}_n = r_n - \sum p_k \cdot (r_{n-k} - \hat{r}_{n-k}) - \sum_{k=1}^{N} p_{-k} \cdot (r_{n+k} - \hat{r}_{n+k}), \quad \text{(Equation 6)}$$

where the first summation uses the causal and the second summation uses the anti-causal information. The apparatus for Equation 6 is depicted in FIG. 7.

The causal and anti-causal prediction coefficients ($p_j$'s) are optimized as follows. The total distortion component $e_n$ given in Equation 4 above can be rewritten as follows:

$$e_n = w_n - \sum_{k=1}^{N} p_k \cdot w_{n-k} - \sum_{k=1}^{N} p_{-k} \cdot w_{n+k}. \quad \text{(Equation 7)}$$

Setting $p_0=-1$, Equation 7 becomes $$e_n = -\sum_{k=-N}^{N} p_k \cdot w_{n-k}.$$

The orthogonality principle states that observations used for prediction are orthogonal to the prediction error, meaning that $E[w_{n-k} e_n]=0$ for $k=\pm 1, \pm 2, \ldots, \pm N$, where E represents the expectation operation. Using this principle, the prediction filter coefficients are computed as follows:

$$\sum_{k=-N}^{N} p_k \cdot R_w(k-i) = 0, i = \pm 1, \pm 2, \ldots, \pm N. \quad \text{(Equation 8)}$$

Equation 8 can be rewritten as $$\sum_{k=1}^{N} p_k \cdot R_w(k-i) + \sum_{k=-N}^{-1} p_k \cdot R_w(k-i) = R_w(-i), i = \pm 1, \pm 2, \ldots, \pm N.$$

Figure 8:
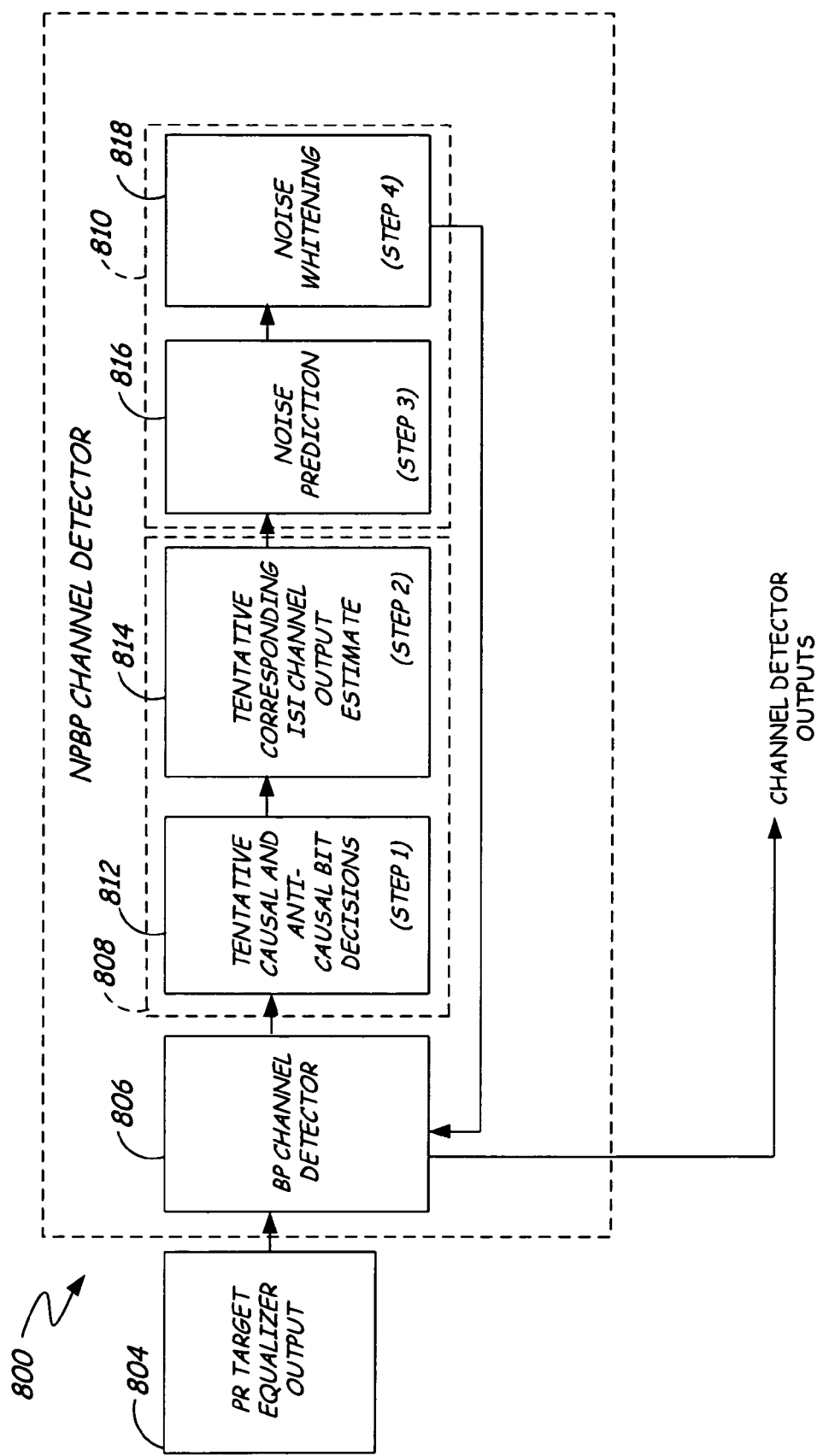
FIG. 8 is a simplified block diagram of an iterative noise whitening system that utilizes causal and anti-causal noise prediction filters according to an embodiment of the present invention.

FIG. 8 is a simplified block diagram illustrating the operation of a noise predictive belief propagation system 800 according to an embodiment of the present invention. The system 800 includes a noise-predictive belief propagation (NPBP) channel detector 802 adapted to receive inputs corresponding to PR target equalizer output 804 and to generate channel detector outputs corresponding to the received inputs. The PR target equalizer can be a linear equalizer that is tuned to any selected PR target.

The NPBP channel detector 802 includes a BP detector 806, a causal and anti-causal channel output module 808, and a noise prediction module 810. The BP detector 806 is adapted to receive PR target equalizer output 804. The BP detector 806 generates tentative causal and anti-causal bit decisions 812 based on the received equalizer output 804 and passes them to the causal and anti-causal channel output module 808 (step 1). The causal and anti-causal channel output module 808 generates tentative ISI channel output estimates 814 based on the tentative causal and anti-causal bit decisions 812 (step 2). The tentative ISI channel output estimates 814 are then passed to the noise prediction module 810. The noise prediction module 810 generates a noise prediction 816 based on a difference between the output estimates 814 and the received equalizer output 804 (step 3). The noise prediction module 810 then performs noise whitening 818 to generate a whitened channel output (step 4), which is fed back to the BP detector 806 to improve subsequent tentative causal and anti-causal bit decisions 812 at each iteration.

In general, since the noise seen by the detector is pattern dependent, a pattern-dependent noise predictive belief propagation channel detector can also realize performance gains over conventional channel detectors. The pattern dependent noise prediction module (such as the noise prediction module 810 in FIG. 8) performs pattern dependent noise prediction while computing the extrinsic a-posteriori probability that each function node transfers to connnected bit nodes as follows:

$$P[x_n = j|r_p] \propto \sum_{Q_l} P[\tilde{r}_p^l | x_n = j, x_{p-v}^{p|n} = (j_1, j_2, \ldots, j_v)] \cdot P[x_{p-v}^{p|n}]$$

where $Q_l[j_1, j_2, \ldots, j_v]$ is the l-th input pattern, $r_p$ is the channel output corresponding to the input sequence $x_n$ for an ISI channel of length v+1, and where $j_i$'s take values from the input alphabet $\{0,1\}$. Variable $\tilde{r}_p^l$ in the equation is the whitened channel output, which is computed as follows:

$$\tilde{r}_p^l = r_n - \sum_{k=1}^{N} p_k^l (r_{n-k} - \hat{r}_{n-k}) - \sum_{k=1}^{N} p_{-k}^l (r_{n+k} - \hat{r}_{n+k})$$

where $P_k^l$ is the pattern dependent noise filter, and $\hat{r}_{n-k}$ is the tentative channel output. To compute the probability of the whitened channel output $$P[\tilde{r}_p^l | x_n = j, x_{p-v}^{p|n} = (j_1, j_2, \ldots, j_v)],$$

the pattern dependent Gaussian noise variance is used.

Figure 9:
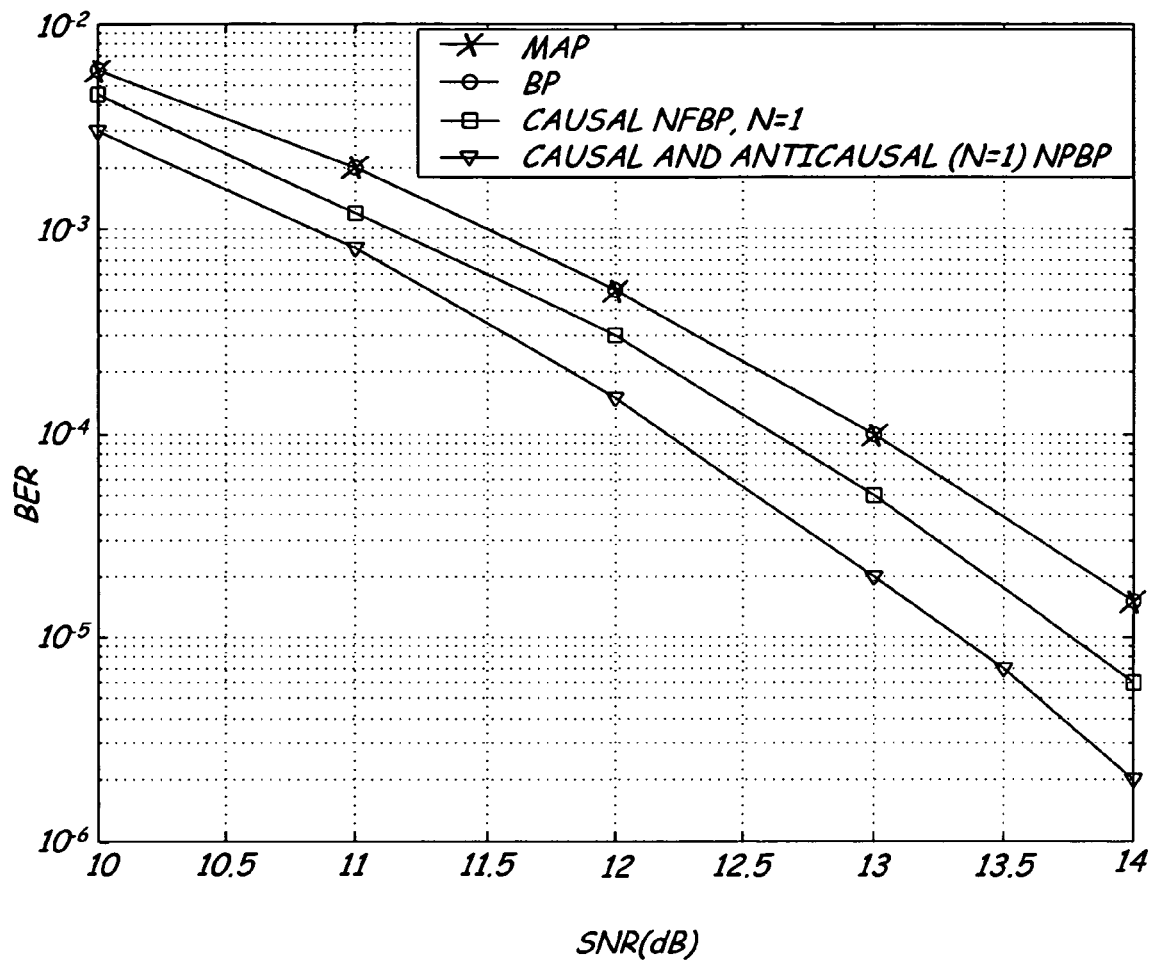
FIG. 9 is a log graph of a bit error rate versus signal to noise ratio performance of an NPBP detector utilizing the causal and anti-causal prediction filter over a D=2.0 uncoded longitudinal recording channel equalized to the PR4 target.
Figure 10:
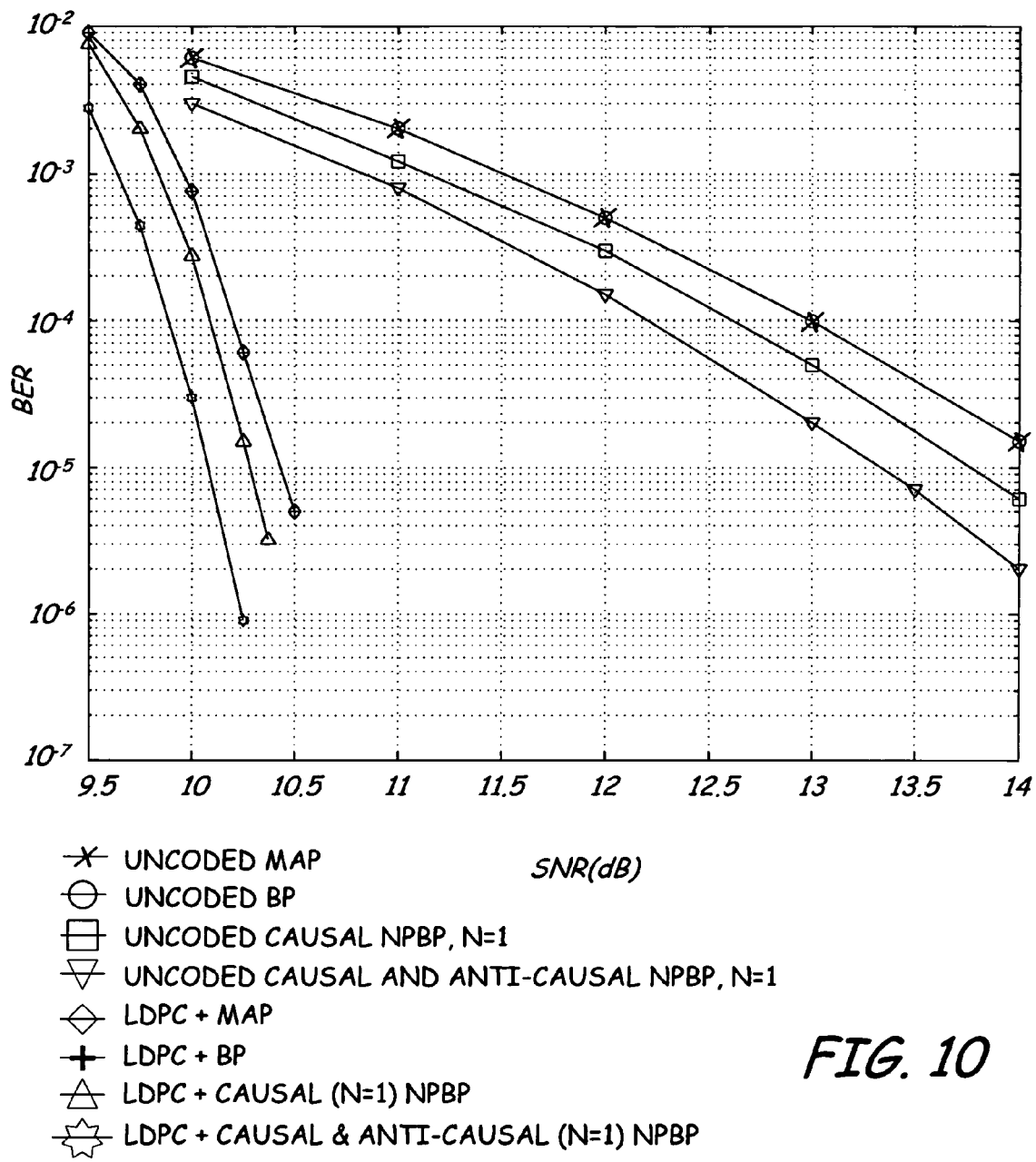
FIG. 10 is a log graph of bit error rate versus signal to noise ratio performance of (L, K, M, cw, rw, $R_c$)=(1107, 986, 123, 3, 27, 0.89) LDPC code over a D=2.0 longitudinal recording channel equalized to the PR4 target.

FIGS. 9 and 10 illustrate the BER performance of the NPBP detector of an embodiment of the present disclosure utilizing a causal and anti-causal prediction filter of length N=1. It is possible that other length prediction filters can improve performance in certain instances, depending on the specific implementations and on the extent to which information from the channel is noisy. While FIGS. 9 and 10 are directed to performance of an embodiment of the present invention coupled to a longitudinal recording channel, the present invention can also be used for perpendicular recording channels.

FIG. 9 illustrates the BER versus SNR performance of the NPBP channel detector over a D=2.0 uncoded, longitudinal recording channel equalized to the PR4 target. Since the factor graph of the PR4 channel is cycle free, the BP detector achieves MAP detector performance after 10 iterations. The NPBP detector using a length one causal-only prediction filter improves the detector performance about 0.5 dB at a BER of approximately $10^{-5}$. The NPBP channel detector of the present invention utilizing an N=1 causal and anti-causal prediction filter improves the performance by an additional 0.5 dB at the same BER, making for an overall 1 dB improvement.

FIG. 10 illustrates the BER versus SNR performance for a coded system, where an outer LDPC code is used. For the coded system, a regular, systematic LDPC code (L, K, M, cw, rw, $R_c$)=(1107, 986, 123, 3, 27, 0.89) was used, where L, K and M denote the number of coded bits, information bits, and parity check bits, respectively. The term $R_c$ represents the code rate, and the terms cw and rw represent the column and row weights, respectively. When a BP or MAP-based channel detector is used, the coding gain is around 3.6 dB at a BER of $10^{-5}$ compared to the uncoded MAP-based channel detector results. The coding gain is 3.75 dB when an NPBP-based detector utilizing a length one causal-only prediction filter is used. The proposed NPBP equalizer achieves the best performance for the coded system as well, with an overall coding gain of 4 dB at a BER of $10^{-5}$. Thus, the NPBP channel detector of the present invention improves the system performance significantly for both coded and uncoded systems.

Figure 11:
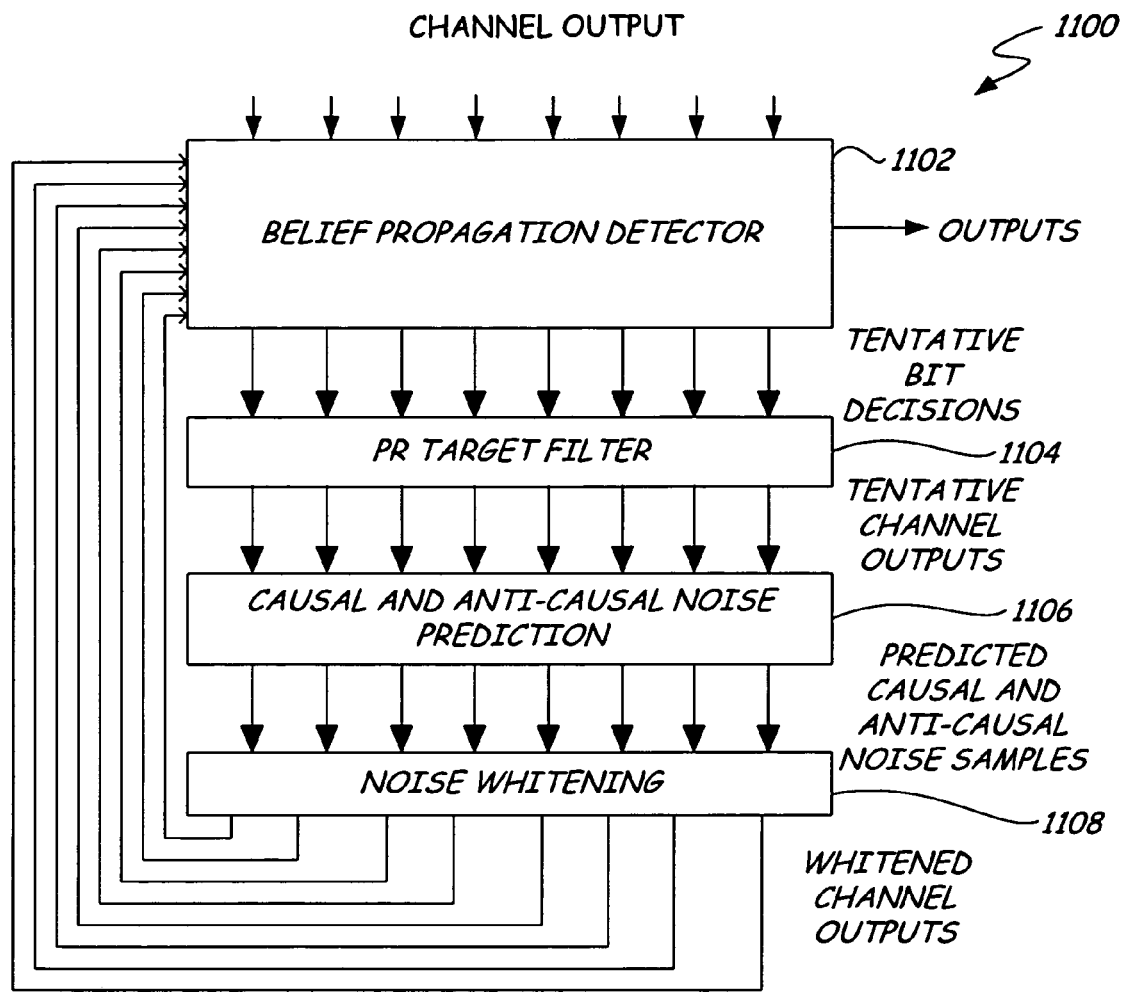
FIG. 11 is a simplified block diagram of an NPBP channel detector with parallel processing according to an embodiment of the present invention.

FIG. 11 is a simplified block diagram of an NPBP channel detection system 1100 according to an embodiment of the present invention. The NPBP channel detection system 1100 includes a belief propagation (BP) detector 1102, a PR target filter 1104 (such as a causal and anti-causal channel output module), a causal and anti-causal noise prediction module 1106, and a noise whitening module 1108. It should be understood that the causal and anti-causal noise prediction module 1106 and the noise whitening module 1108 can be combined into a noise prediction module (such as that the causal and anti-causal noise prediction module 418 in FIG. 4). Moreover, it should be understood that the NPBP channel detection system 1100 can be implemented, for example, in circuitry such as circuitry 130 or within a read/write head on slider 110 in FIG. 1, depending on the implementation.

Generally, the BP detector 1102 receives channel outputs from a channel. The BP detector 1102 detects the channel output and generates tentative bit decisions (hard bit decisions from log likelihood ratios) based on the detected channel outputs. The PR target filter 1104 receives the tentative bit decisions and generates tentative channel outputs based on the tentative bit decisions. The causal and anti-causal noise prediction module 1106 receives the tentative channel outputs and predicts causal and anti-causal noise samples based on a difference between the channel outputs and the tentative channel outputs. A noise whitening module 1108 uses the predicted causal and anti-causal noise samples to whiten the channel outputs, which are fed back to the BP detector 1102.

Figure 12:
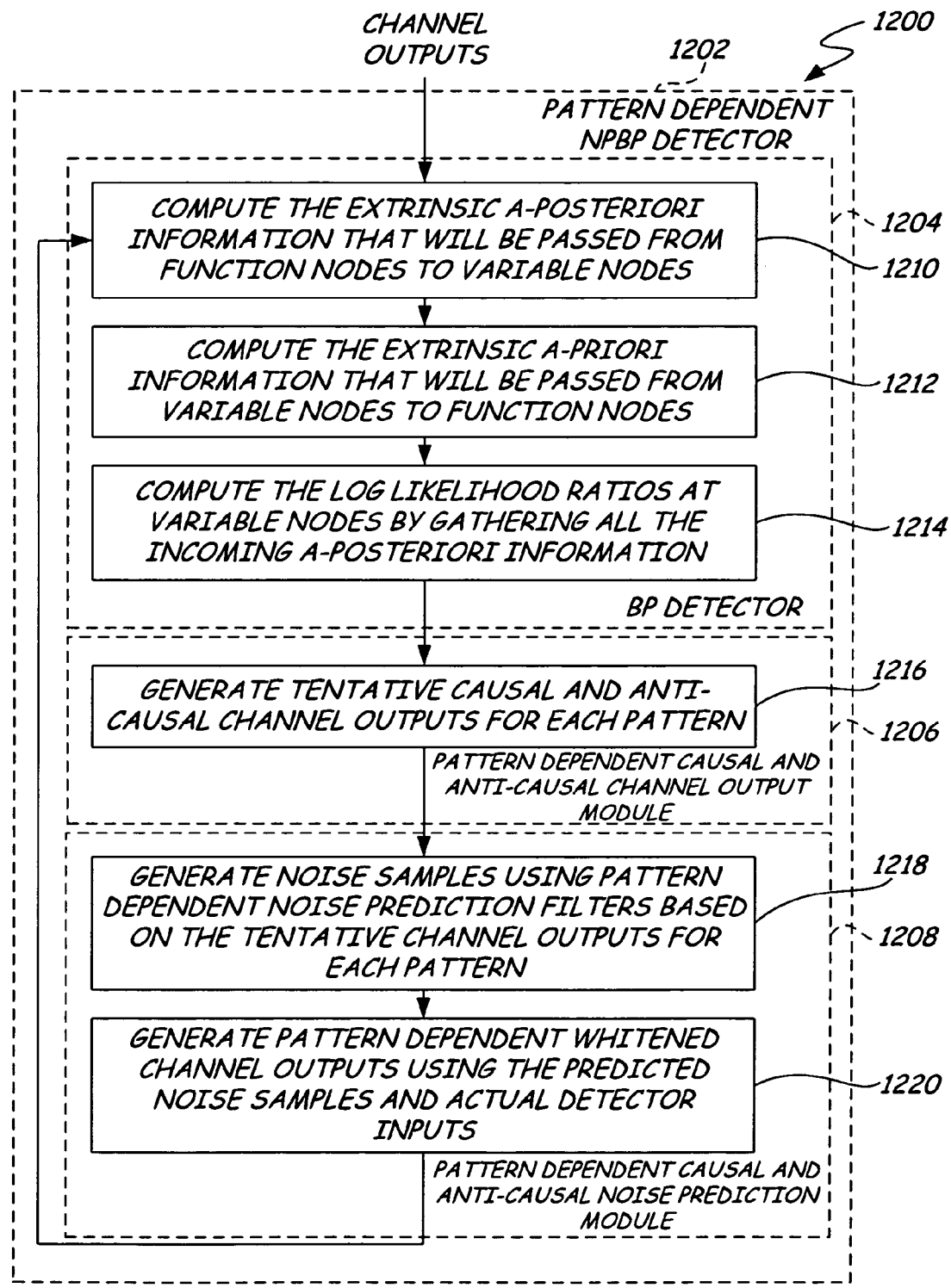
FIG. 12 is a simplified block diagram of a pattern dependent NPBP channel detector according to an embodiment of the present invention.

FIG. 12 is a simplified block diagram of a pattern dependent (PD) NPBP system 1200 according to an embodiment of the present invention. The PD-NPBP system 1200 includes a PD-NPBP channel detector 1202 coupled to a channel and adapted to receive detector inputs from the channel. The PD-NPBP channel detector 1202 includes a belief propagation detector 1204, a pattern dependent causal and anti-causal channel output module 1206, and a pattern dependent causal and anti-causal noise prediction module 1208. The channel output module 1206 and the noise prediction module 1208 can be combined or integrated into the BP detector 1204.

In general, the BP detector 1204 computes the extrinsic a-posteriori information that will be passed from function nodes to variable nodes (1210). The BP detector 1204 computes the extrinsic a-priori information that will be passed from the variable nodes to the function nodes (1212). The BP detector 1204 then computes the log likelihood ratios (LLRs) at the variable nodes by gathering all the incoming a-posteriori information (1214). The BP detector 1204 uses the LLRs to make hard decisions corresponding to the ISI channel inputs. The hard decisions are then passed to the pattern dependent causal and anti-causal channel output module 1206, which filters these tentative hard decisions through the PR target to obtain the corresponding tentative channel outputs (1216). The tentative channel outputs are then passed to the pattern dependent causal and anti-causal noise prediction module 1208 ("noise prediction module 1218"). The noise prediction module 1208 generates noise samples using pattern dependent noise prediction filters based on the tentative channel outputs for each pattern (1218). The noise prediction module 1208 then generates pattern dependent whitened channel outputs using the predicted noise samples and actual detector inputs (1220). The whitened channel outputs are then fed back from the noise prediction module 1208 to the BP detector 1204.

Though the noise prediction module 1208 and channel output module 1206 are depicted as separate components of the PD-NPBP channel detector 1202, noise prediction module 1208, the channel output module 1206, and the BP channel detector 1204 can be combined into a single functional unit that performs all of the functions.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the bidirectional noise prediction system while maintaining substantially the same functionality without departing from the scope and spirit of the present invention. In addition, although the preferred embodiment described herein is directed to a noise predictive belief propagation system for detecting information from an ISI channel with correlated additive noise (such as a magnetic recording medium), it will be appreciated by those skilled in the art that the teachings of the present invention can be applied to other types of communication media, without departing from the scope and spirit of the present invention.

What is claimed is:

1. A channel detector comprising:
   a belief propagation detector coupled to a channel and adapted to receive a detector input, the belief propagation detector adapted to generate tentative bit decisions based in part on the detector input, the belief propagation detector to iteratively exchange information between variable nodes representing input bits from the detector input and function nodes representing output bits from a decoder output, the belief propagation detector to generate the tentative bit decisions after a number of iterations;
   a causal and anti-causal channel output module coupled to the belief propagation detector and adapted to generate causal outputs representing past bit decisions and anti-causal channel outputs representing predicted future bit decisions based on the tentative bit decisions; and
   a noise prediction module coupled to the causal and anti-causal channel output module and adapted to predict noise samples based on a difference between the detector input and the causal and anti-causal channel outputs, the noise prediction module adapted to whiten the detector input with the predicted noise samples and to return the whitened detector input to the belief propagation detector to generate new tentative bit decisions using the whitened detector input for edge probability estimations within the belief propagation detector to iteratively detect the detector input.

2. The channel detector of claim 1 wherein the belief propagation detector uses the whitened detector input to generate the new tentative bit decisions based on soft information of the causal and anti-causal channel outputs.

3. The channel detector of claim 1 wherein the noise prediction module comprises a pattern dependent noise-prediction module.

4. The channel detector of claim 1 wherein the noise prediction module comprises:
   a causal and anti-causal noise prediction module adapted to predict the noise samples; and
   a noise whitening module adapted to whiten the detector input with the predicted noise samples.

5. The system of claim 4 wherein the belief propagation detector generates log likelihood ratios based on the detector input and generates tentative bit decisions based on the log likelihood ratios.

6. The system of claim 1 wherein the channel detector iteratively processes the detector input until a predetermined number of iterations are complete.

7. The system of claim 1 wherein the channel detector processes bits within the detector input in parallel.

8. A method for detecting information from an ISI channel, the method comprising:
   generating tentative bit decisions with a belief propagation detector based on a received detector input;
   generating tentative causal and anti-causal channel outputs using a causal and anti-causal channel output module based on the tentative bit decisions;
   predicting noise samples with a noise prediction module based on a difference between the tentative causal and anti-causal channel outputs and the received detector input;
   whitening the received detector input with the noise prediction module to form a whitened detector input using the predicted noise samples;
   generating new tentative bit decisions via the belief propagation detector using the whitened detector input for edge probability estimations; and
   repeating iteratively the steps of generating the tentative causal and anti-causal channel outputs, predicting the noise samples, whitening the detector input, and generating new tentative bit decisions based on the whitened detector input.

9. The method of claim 8 wherein the step of repeating comprises repeating until a predetermined number of iterations is completed.

10. The method of claim 8 wherein the belief propagation detector uses the whitened detector input for edge probability computations within the belief propagation detector.

11. The method of claim 8 wherein before the step of generating the tentative bit decisions, the method further comprises:
    receiving the detector input from the channel with correlated noise; and
    calculating log likelihood ratios for the received detector input using the belief propagation detector, wherein the tentative bit decisions are generated based on the calculated log likelihood ratios.

12. The method of claim 8 wherein the step of generating tentative causal and anti-causal channel outputs comprises: filtering the tentative bit decisions through a PR target module to obtain the tentative causal and anti-causal channel outputs corresponding to the tentative bit decisions.

13. The method of claim 8 wherein the step of whitening comprises:
    predicting noise samples for each bit contained in the received detector input based on past and future tentative bits in the detector input; and
    forming the whitened detector input using the predicted noise samples.

14. The method of claim 13 wherein the step of predicting, the method further comprises:

calculating log likelihood ratios of the detector input using the belief propagation detector; and repeating the step of calculating until the log likelihood ratios converge to avoid error propagation.

15. A channel detector comprising:

a belief propagation detector adapted to generate tentative bit decisions based on a detector input sequence, the belief propagation detector to iteratively exchange information between variable nodes representing input bits from the detector input and function nodes representing output bits from a decoder output, the belief propagation detector to generate the tentative bit decisions after a number of iterations;

a causal and anti-causal output module coupled to the belief propagation detector and adapted to generate tentative causal and anti-causal channel outputs based on the tentative bit decisions; and a pattern dependent noise prediction module coupled to the causal and anti-causal output module and to the belief propagation detector, the pattern dependent noise prediction module adapted to iteratively predict pattern dependent noise based on the detector input sequence and the tentative causal and anti-causal channel outputs, the pattern dependent noise prediction module adapted to generate a whitened detector input sequence based on the predicted noise and to return the whitened detector input sequence to the belief propagation detector;

wherein the belief propagation detector, the causal and anti-causal output module, and the pattern dependent noise prediction module iteratively detect the detector input sequence;

wherein the whitened detector input sequence is fed back to the belief propagation detector for use in subsequent iterations for edge probability estimation.

16. The channel detector of claim 15 wherein the belief propagation detector is adapted to use the whitened detector input sequence for iterative edge probability computations.

17. The channel detector of claim 15 wherein the noise prediction module is adapted to calculate a total noise distortion component based on past and future bits of the detector input sequence.

18. The channel detector of claim 15 wherein the noise prediction module is adapted to whiten the detector input sequence based on a total noise distortion component of the detector input sequence to produce the whitened detector input sequence.

\* \* \* \* \*

UNITED STATES PATENT AND TRADEMARK OFFICE
CERTIFICATE OF CORRECTION

| | | |
|---|---|---|
| PATENT NO. | : 7,561,640 B2 | Page 1 of 1 |
| APPLICATION NO. | : 11/102622 | |
| DATED | : July 14, 2009 | |
| INVENTOR(S) | : Kaynak et al. | |

It is certified that error appears in the above-identified patent and that said Letters Patent is hereby corrected as shown below:

Title Page, item (54) "Method and Apparatus for Interative Noise Whitening With Causal and Anti-Causal Prediction Filters" should be changed to --Method and Apparatus for Iterative Noise Whitening With Causal and Anti-Causal Prediction Filters--

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,561,640 B2  Page 1 of 1
APPLICATION NO. : 11/102622
DATED : July 14, 2009
INVENTOR(S) : Kaynak et al.

It is certified that error appears in the above-identified patent and that said Letters Patent is hereby corrected as shown below:

Title Page, item (54) and at Column 1, lines 1-4, title: "Method and Apparatus for Interative Noise Whitening With Causal and Anti-Causal Prediction Filters" should be changed to --Method and Apparatus for Iterative Noise Whitening With Causal and Anti-Causal Prediction Filters--

This certificate supersedes the Certificate of Correction issued March 16, 2010.

Signed and Sealed this

Sixth Day of April, 2010

David J. Kappos
*Director of the United States Patent and Trademark Office*